United States Patent

Gregory, Sr. et al.

[11] Patent Number: 6,014,853
[45] Date of Patent: Jan. 18, 2000

[54] PULL-TYPE TOBACCO HARVESTER

[76] Inventors: Charles E. Gregory, Sr., 1304 Chauncey Dr., Tarboro, N.C. 27886; Charles E. Gregory, Jr., Rte. 1, Box 101, Hobgood, N.C. 27843; William A. Slade, P.O. Box 142, Aulander, N.C. 27805

[21] Appl. No.: 08/963,328

[22] Filed: Nov. 3, 1997

[51] Int. Cl.[7] .................................................. A01D 45/16
[52] U.S. Cl. ............................................. 56/27.5; 280/638
[58] Field of Search .............................. 56/27.5, 121.42, 56/121.46; 414/26; 180/906; 280/638

[56] References Cited

U.S. PATENT DOCUMENTS

| | | | |
|---|---|---|---|
| 4,332,128 | 6/1982 | Prince | 56/27.5 |
| 4,378,669 | 4/1983 | Prince | 56/27.5 |
| 5,255,756 | 10/1993 | Follmer et al. | 180/906 X |

FOREIGN PATENT DOCUMENTS

| | | | |
|---|---|---|---|
| 3-273 980 | 12/1991 | Japan | 180/906 |
| 2 213 109 | 8/1989 | United Kingdom | 280/638 |

*Primary Examiner*—H. Shackelford

[57] ABSTRACT

The present invention entails a pull-type tobacco harvester having a mainframe, a tongue projecting from the mainframe, a defoliating unit mounted on the mainframe, and a conveyor assembly disposed adjacent the defoliating unit for conveying defoliated tobacco leaves from the defoliator unit upwardly and rearwardly to where the defoliated leaves are dumped into a trailing trailer. Disposed on one side of the mainframe is a single wheel while mounted to the opposite side of the mainframe is a pair of tandem wheels. The pair of tandem wheels are disposed so as to generally track behind a tractor that pulls the tobacco harvester through the field. In addition, the defoliator unit mounted on the harvester is a knife-type defoliator that comprises a series of bars that include knife elements thereon for cutting leaves from stalks of tobacco passing through the defoliator unit. The defoliator unit of the present invention includes a stalk guide structure in the form of a series of beads, with each beads being disposed on an inner side of a bar that carries the knife elements. Because the bead projects at least slightly inwardly from the bars, the beads act to guide tilted or blown over tobacco stalks generally to an upright position where the leaves thereon can be harvested efficiently without the knife elements cutting the stalks down.

19 Claims, 8 Drawing Sheets

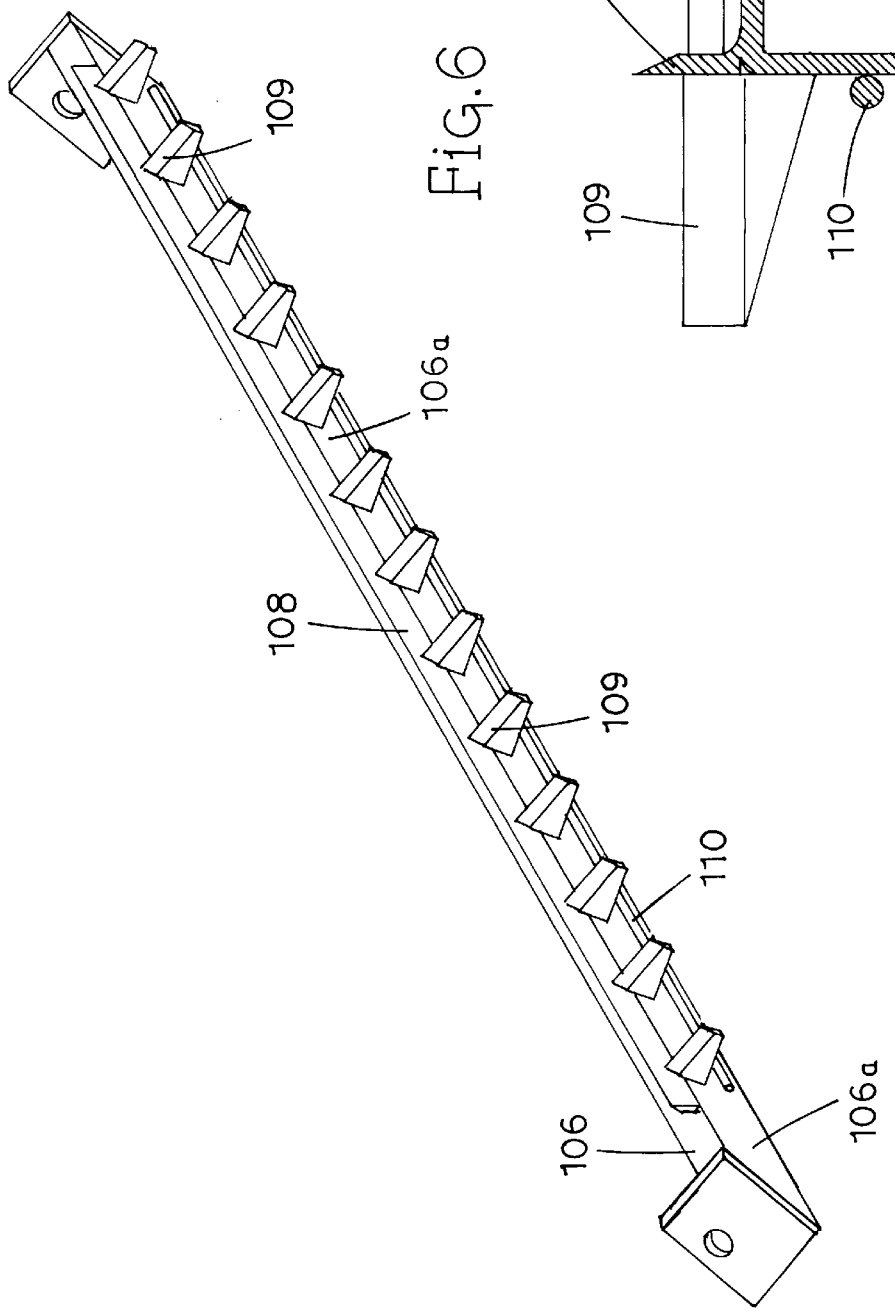

PULL-TYPE TOBACCO HARVESTER

FIELD OF THE INVENTION

The present invention relates to automatic tobacco harvesters and more particularly to a pull-type automatic tobacco harvester.

BACKGROUND OF THE INVENTION

Pull-type tobacco harvesters have been used by tobacco farmers for some time to harvest tobacco. Generally, a pull-type tobacco harvester includes a mainframe having a tongue that projects therefrom and connects to a tractor. In addition, there is provided a leaf defoliating unit on the mainframe and a conveyor assembly for conveying tobacco leaves harvested by the defoliator assembly, the conveyor assembly functioning to convey the leaves generally upwardly and rearwardly to where they are discharged into a trailer or other receptacle disposed behind the pull-type harvester.

Because of the nature of tobacco and the row planting scheme employed by tobacco farmers, pull-type tobacco harvesters are designed to be pulled at an offset position relative to the tractor pulling the harvester through the field. The fact that the tobacco harvester is offset with respect to the tractor gives rise to a number of problems and concerns. Because tobacco is a row crop, it is appreciated that the harvester must be aligned with the row or rows being harvested such that that the row of tobacco stalks is precisely aligned with the defoliator unit. This is important because as the tobacco stalks pass through the defoliator unit, it is important that only the leaves be defoliated from the stalks and that the stalks remain generally intact. However, because of the offset relationship of the harvester with respect to the tractor, precise row alignment is difficult to achieve and maintain even under the best of conditions.

There are a number of factors that contribute to the difficulty of maintaining row alignment with the defoliator unit. First, the operator is not located closely adjacent the defoliator unit and the row of tobacco being harvested. Indeed, the operator is stationed on a tractor that is a considerable distance forward of the defoliator unit and offset to one side. Therefore, it is difficult for the operator to continuously precisely judge the alignment between the throat or entry way of the defoliator and the row of tobacco being harvested. Next, it is a common occurrence that tobacco stalks are not always maintained in a straight upright position in the row. Often, the stalks can be blown to one side or simply can grow in a direction that causes some portion of the stalks to project outside of the true plane of the tobacco row. Finally, one of the most important factors contributing to defoliator-row alignment problems, is the common tracking problems that one finds with an offset pull-type tobacco harvester. Because of the offset relationship of the harvester and the orientation of the tractor with respect to the harvester, it is not unusual for the harvester to fail to track accurately through the tobacco field. This tracking problem is even more of a concern in wet, hilly, or sandy soil conditions. In such conditions, the harvester tends to slip and slide from one side to the other and because there is not a great deal of room for misalignment between the row being harvested and the throat of the defoliator, it follows that even a few inches of misalignment can result in the defoliator unit cutting and destroying entire row segments, all of which results in damage and crop loss to the tobacco farner.

Therefore, there has been and continues to be a need for a pull-type tobacco harvester that exhibits superior tracking ability even in wet and hilly conditions.

As discussed above, tobacco harvesters of all types use what is commonly referred to as a knife-type defoliator. W. E. Splinter in U.S. Pat. No. 3,093,949 discloses a tobacco leaf defoliator assembly of the knife type. Structurally, the Splinter knife head defoliator comprises a pair of inclined and laterally spaced defoliator side units that in operation are generally disposed on opposite sides of a tobacco row and are designed to allow individual stalks of the row to pass therethrough as the defoliator assembly is moved along the tobacco row by a tobacco harvester.

From a study of the Splinter patent, it can be seen that as the defoliator assembly moves along the tobacco row, certain sets of knife blades move inwardly from opposite sides of the row to project through the plane of the tobacco row and adjacent and between the respective stalks passing through the defoliator assembly. As the knife blades move to a position where they project adjacent and between successive stalks, the defoliator assembly then drives these blades upwardly and forwardly relative to the harvester. As the blades move upwardly adjacent respective stalks, they engage certain tobacco leaves extending from the stalks and defoliate the leaves from the stalks, while the forward component enables the blade to move forwardly as the harvester moves forwardly.

The Splinter type tobacco leaf defoliator works extremely well in tobacco crops where the stalks are all upright and aligned so as to extend in the same plane. But in the practical world, one seldom finds tobacco fields where all of the stalks of a tobacco row project upright and fall precisely within the plane of the row. In the real world, one finds stalks of tobacco that have been blown over and are tilted out of the plane of the row. This can make harvesting tobacco with the Splinter knife-type defoliator difficult. As pointed out above, there is not a great deal of tolerance for row misalignment with respect to the defoliator assembly. When the defoliator unit reaches field areas where the stalks are blown or otherwise tilted to one side, it is common to find that the defoliator unit simply tends to cut and chop the stalks and consequently instead of harvesting the leaves, this situation results in substantial crop loss. In many cases, the tobacco stalks are simply cut and chewed apart and left laying in the field. In some cases, the knife-type defoliator actually cuts stalk portions of the tobacco and the stalk portions fall onto the conveyor assembly where they are conveyed into the tobacco leaf receptacle. Both cases are quite undesirable for obvious reasons.

Therefore, there is and continues to be a need for a knife-type defoliator that will tend to upright the stalks and align them in such a fashion that the leaves can be harvested without the stalks being cut and the tobacco crop being destroyed.

SUMMARY OF THE INVENTION

The present invention entails a pull-type tobacco harvester that is designed to overcome the shortcomings and disadvantages of prior known pull-type tobacco harvesters. In particular, the tracking and stability concerns have been addressed by providing the pull-type tobacco harvester with a mainframe that is supported on the inboard side of the harvester by a pair of tandem wheels. The presence of the tandem wheels on the inboard side improves the tracking characteristics of the harvester and tends to discourage the harvester from pivoting or rotating about the inboard wheel structure of the harvester.

In a preferred embodiment, the pull-type harvester is provided with a mainframe and a tongue that projects from adjacent the inboard side of the mainframe. A defoliator unit is mounted on the mainframe as well as a conveyor assembly which functions to transfer defoliated leaves from the defoliating unit to a discharge point where the leaves are dumped or discharged into a receptacle or trailer. Secured to the mainframe about the inboard side is a floating wheel arm. Mounted to opposite end portions of the floating wheel arm is the pair of tandem wheels. Secured to the outboard or opposite side of the mainframe is a single wheel thereby giving rise to a pull-type harvester supported on three wheels.

The defoliator unit or assembly that forms a part of the present invention is of a knife head type defoliator. As such, the defoliator unit includes two sets of laterally spaced bars with each bar including longitudinal and transverse knife blades for cutting leaves from tobacco stalks passing through the defoliator unit. In order to deal with blown over tobacco stalks, the defoliator unit is provided with a structure that tends to upright the stalks and cause the stalks to be walked up the defoliator unit in a way that reduces the occurrence of the blades actually cutting the stalks as opposed to simply cutting or defoliating the leaves. In one embodiment of this invention, this structure entails a bead or a protrusion that is formed on the inside of respective defoliator bars just under the various knives carried by the bars. This bead or protrusion tends to engage the stalk and to space the stalk from the cutting knives carried by the bars. Essentially, the presence of the bead or protrusion that extends inwardly from the respective bars tends to keep the tobacco stalks away from the portion of the knives disposed immediately adjacent the inner side of the defoliator bars. By doing so, stalk cutting is minimize and in the process, the beads or the protrusions appearing on the inner side of the respective bars tends to upright the stalks and walk and urge the stalks to an upright central position where they can pass through the defoliator unit without the stalks themselves being chopped and cut.

It is therefore an object of the present invention to provide a pull-type automatic tobacco harvester that has improved tracking and stability characteristics.

A further object of the present invention is to provide a knife-type defoliator head for an automatic tobacco harvester that reduces the occurrence of stalk cutting especially in cases where the tobacco stalks have been blown or fallen to one side of the row.

Other objects and advantages of the present invention will become apparent and obvious from a study of the following description and the accompanying drawings which are merely illustrative of such invention.

BRIEF DESCRIPTION OF THE DRAWINGS

FIG. 6 is a perspective view of a cutter bar of the defoliator unit of the present invention.

FIG. 7 is a cross-sectional view of the cutter bar.

DETAILED DESCRIPTION OF THE INVENTION

Figure 8:
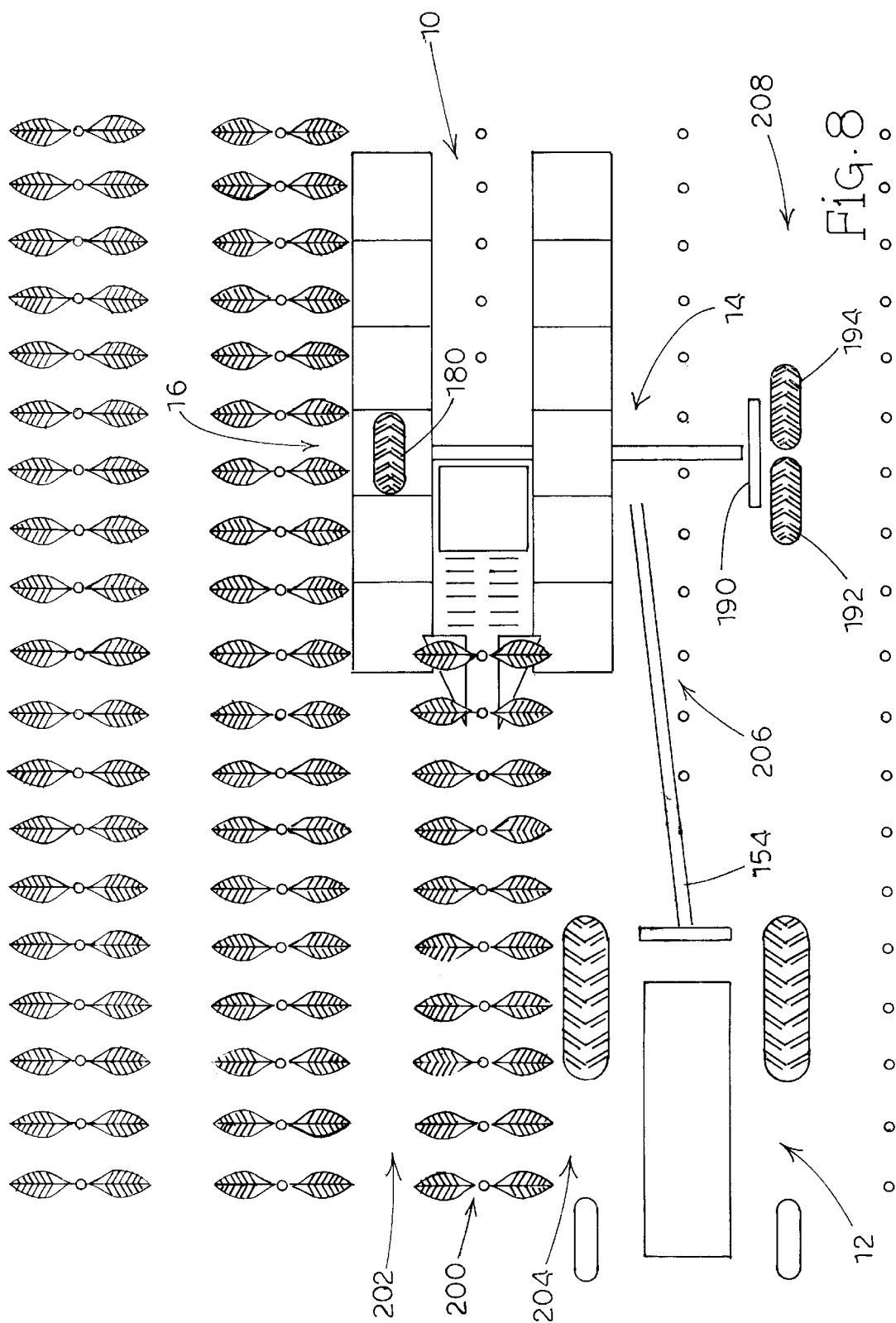
FIG. 8 is a schematic view illustrating the pull-type tobacco harvester being pulled through a tobacco field.

With further reference to the drawings, the pull-type tobacco harvester of the present invention is shown therein and indicated generally by the numeral 10. Tobacco harvester 10, as illustrated in FIG. 8, is adapted to be pulled through a tobacco field by a tractor indicated generally by the numeral 12. For purposes of reference, the tobacco harvester 10 includes an inboard side 14 and an outboard side 16. As illustrated in FIG. 8, the inboard side 14 of the harvester is that side of the harvester that is disposed closest to the tractor 12 during a normal harvesting operation.

Now, turning to a discussion of the pull-type tobacco harvester 10, it is seen that the same includes a mainframe indicated generally by the numeral 30. Mainframe 30 comprises a simple upright vertical frame structure that supports a defoliator unit, a pair of conveyors and other related structure to be hereafter described in more detail. As viewed in FIG. 5, the mainframe 30 includes upper and lower transverse cross-members 32 and 34. Extending between the cross-members 32 and 34 is a pair of end vertical members 36 and 38. Disposed between the end members 36 and 38 is an intermediate vertical member 40.

Figure 1A:
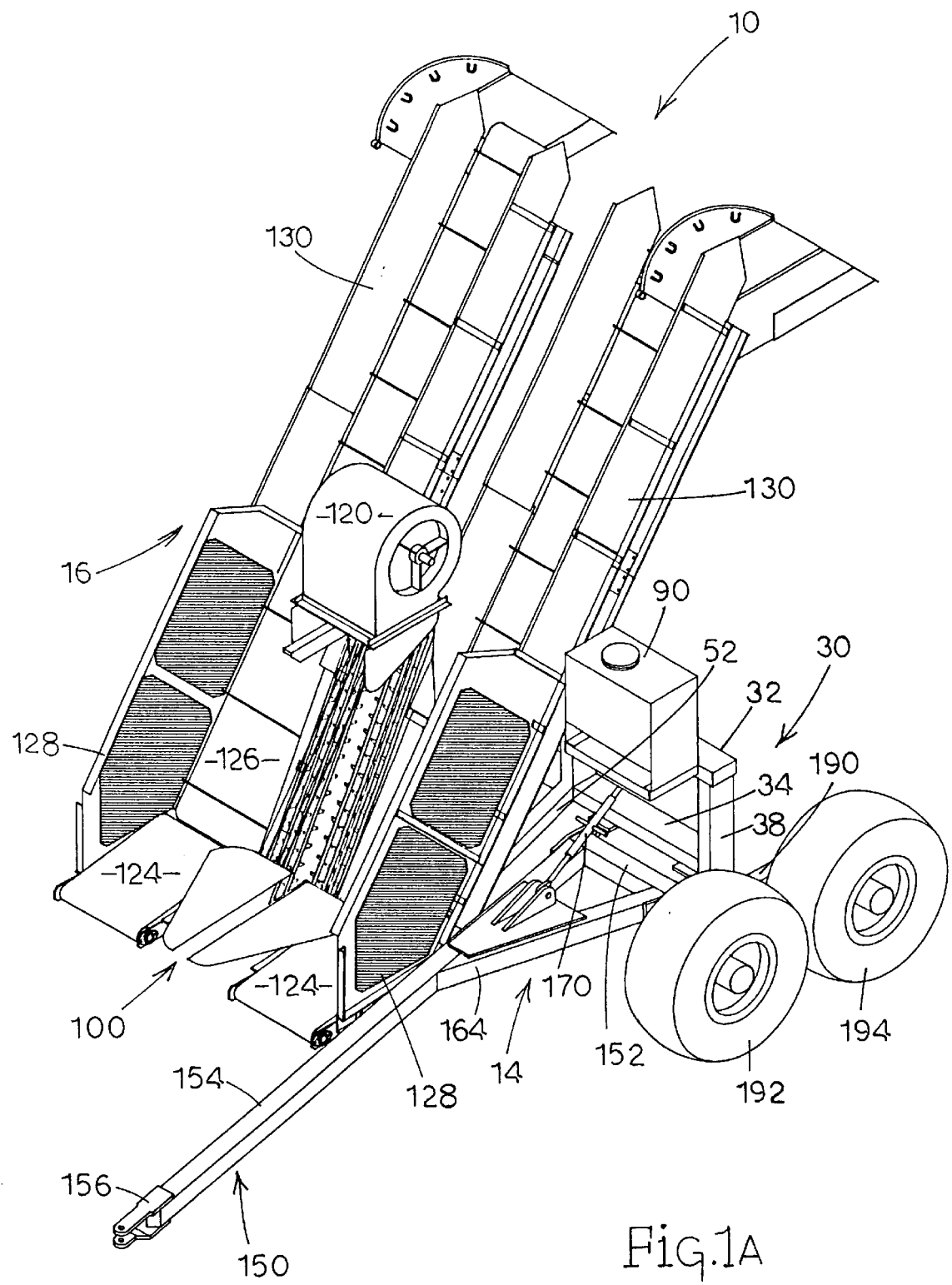
FIG. 1A is a perspective view of the pull-type automatic tobacco harvester of the present invention as viewed from the inboard side of the harvester.
Figure 4:
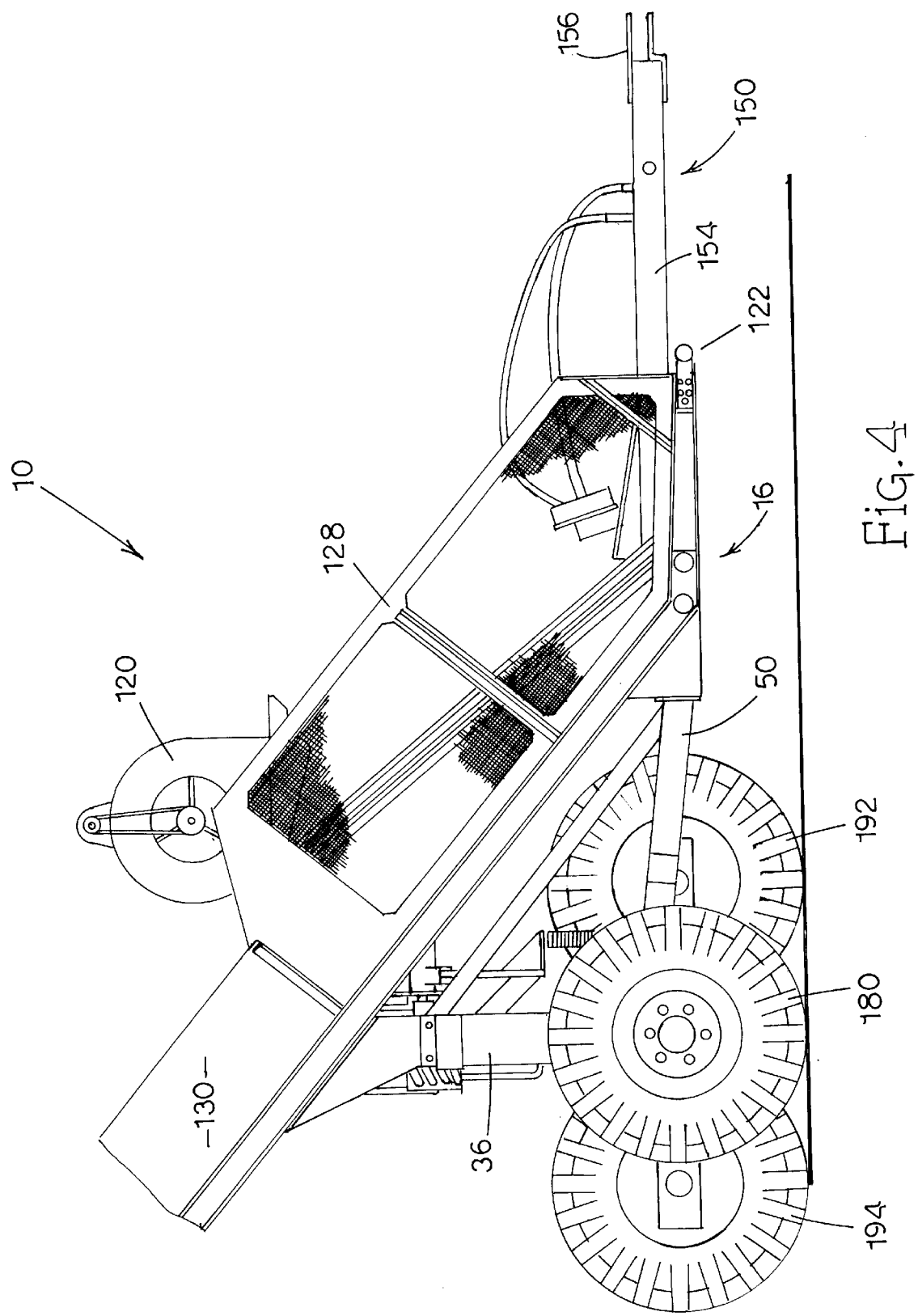
FIG. 4 is a side elevational view of the tobacco harvester showing the outboard side.

As will be discussed subsequently herein, the tobacco harvester 10 includes a conveyor system for conveying tobacco leaves from a defoliator unit to a discharge area. For supporting a portion of one conveyor unit, there is provided a right side brace network 50 that is secured to the mainframe 30 and which projects generally therefrom (FIG. 4). (Sometimes herein references are made to right and left hand and those references are based on one standing behind the mainframe 30 and facing forwardly). Likewise, there is provided an intermediate brace network 52 that is also secured to the mainframe 30 and which projects generally forwardly therefrom (FIG. 1A). Intermediate brace network 52 serves to support a second conveyor unit.

Also secured to the mainframe 30 intermediately thereon is a defoliator unit support 54. As will be appreciated from subsequent portions of this disclosure, the defoliator support 54 acts to support the defoliator unit, which will be hereinafter described, on the mainframe 30.

Figure 5:
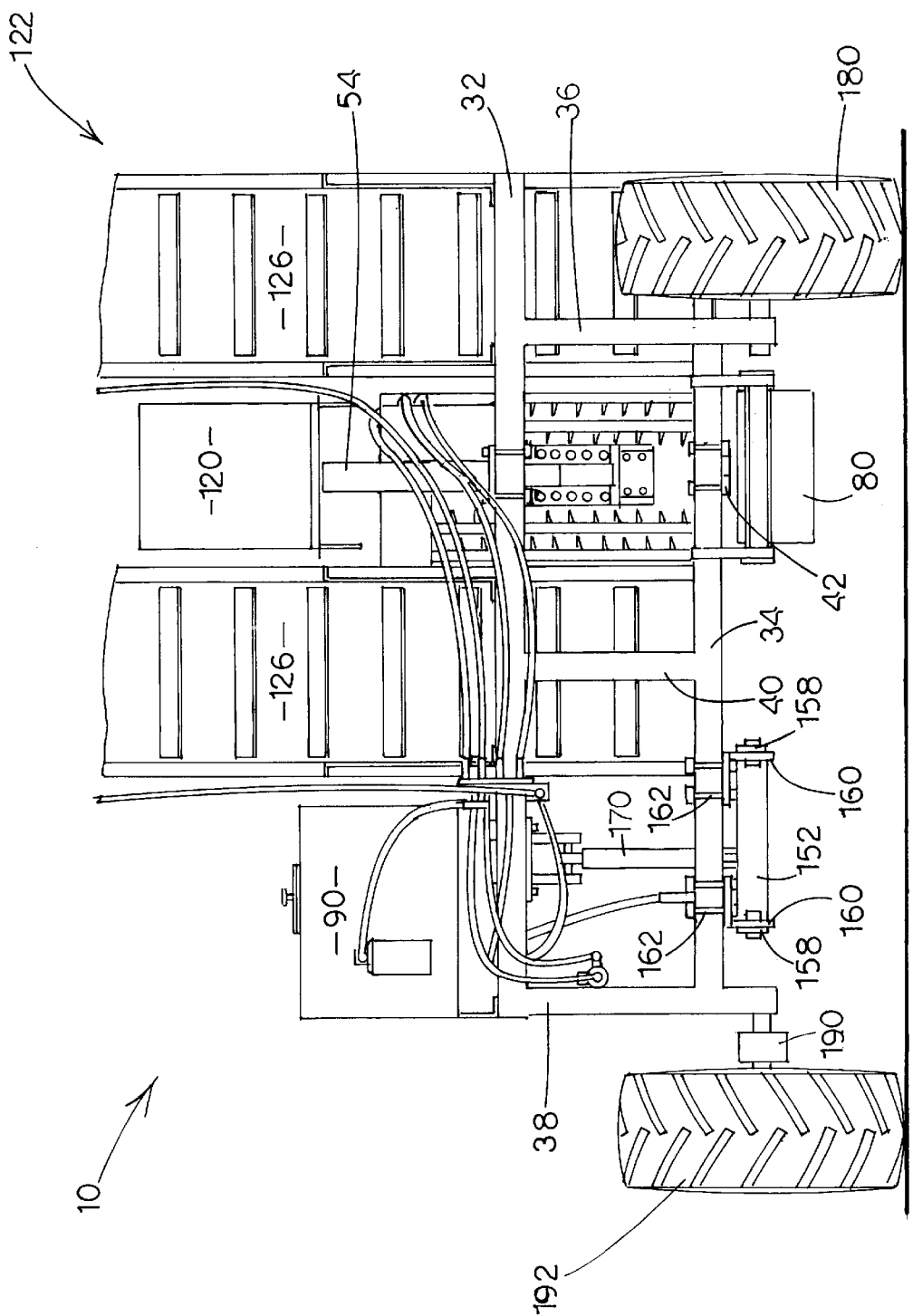
FIG. 5 is a rear elevational view illustrating the mainframe of the tobacco harvester.

Secured about the front portion of the mainframe 30 is a stalk cutter assembly indicated generally by the numeral 80 (FIG. 5). Details of the stalk cutter assembly are not dealt with herein in detail because such stalk cutters are known and in fact are employed on other commercially available pull-type tobacco harvesters. Suffice it to say that the stalk cutter assembly 80 includes a pivotally mounted carrier frame comprised of two spaced apart arms and a star wheel cutter rotatively mounted between the arms. In addition, the stalk cutter assembly is provided with a downwardly biasing assembly that generally biases the carrier frame downwardly during the stalk cutting operation but permits the stalk cutter assembly to move generally up and down as the stalk cutter 80 rides over and cuts through succeeding stalks being traversed by the harvester 10.

The pull-type tobacco harvester 10 of the present invention, like most automatic tobacco harvesters, preferably includes a hydraulic drive system for driving the various moving components of the harvester. Thus, as shown in FIG. 1A, a hydraulic fluid tank 90 is mounted on the mainframe and adapted to supply hydraulic fluid to the various drive components employed on the tobacco harvester. Details of the hydraulic control system are not presented in detail because such control systems are widely used on both self-propelled and pull-type tobacco harvesters that are commercially available today. Suffice it to say that a control module is extended from the harvester to the tractor 12 and mounted on the tractor in reach of the operator. There, the operator can activate and control various hydraulic components, which in turn control certain harvester components such as the defoliator unit, conveyor assembly, etc.

In order to harvest the tobacco, the harvester 10 is provided with a defoliator unit 100 that is mounted and supported by the mainframe 30 and the defoliator support structure 54 just discussed. There are numerous types of defoliators used on automatic tobacco harvesters. Basically, the two most prevalent types of defoliator units are the spiral roll type such as shown and disclosed in U.S. Pat. No. 2,834,174 and the knife-type defoliator (previously discussed) shown and disclosed in U.S. Pat. No. 3,093,949. Both U.S. Pat. Nos. 2,834,174 and 3,093,949 are expressly incorporated herein by reference.

Shown on the tobacco harvester 10 of the present invention is a knife-type defoliator which is particularly useful and well-accepted for defoliating the upper leaves from the tobacco stalks during a harvesting operation. Briefly, the knife-type defoliator unit 100 shown herein includes a pair of side-by-side defoliator assemblies. More particularly, each side defoliator assembly includes an upper rotor 102 and a lower rotor 104. Connected between the upper and lower rotors 102 and 104 is a series of defoliator bars 106. Each defoliator bar 106 include an inner side 106a that assumes a position adjacent the stalks of tobacco as the defoliator bar is moved inwardly and upwardly during the leaf defoliating process.

Secured to each defoliator bar is a series of knife blades that act to engage and cut tobacco leaves from the stalks during the harvesting process. In this regard, the knife blades include a longitudinal knife blade 108 that extends upwardly and adjacent the inner side 106a of each defoliator bar. See FIGS. 6 and 7. In addition, longitudinally spaced on each defoliator bar is a series of transverse blades 109 that project inwardly from the inner side 106a of the defoliator bars.

Formed on the inner side 106a of each defoliator bar is a stalk guide or spacer that assists in uprighting blown over or tilted tobacco stalks during the harvesting operation. It is not unusual for wind to blow tobacco stalks over or to one side of the row or for that matter for the stalks to simply grow to one side for any number of reasons. This presents a problem in harvesting tobacco. This is because as the defoliator unit 100 engages tilted or blown over stalks, it is not uncommon for the knife blades, particularly the transverse knife blades 109 to engage the stalks and actually cut the stalks resulting in crop damage and loss of tobacco. In order to facilitate the uprighting of blown over tobacco stalks and to avoid cutting the tobacco stalks with the knife blades that form a part of the defoliator unit 100, the present invention provides a protrusion or spacer along the inner side 106a of each of the defoliator bars 106. In the case of the embodiment illustrated herein, that spacer or protrusion assumes the form of a bead 110. In practice, the beads 110, as they move around the rotors 102 and 104 and move generally laterally and upwardly for engagement with the blown over stalk, tend to upright the stalks and walk the stalks up in such a fashion that the knife blades are not as prone to engage and cut the respective stalks.

The respective upper and lower rotors 102 and 104 of the defoliator unit 100 are conventionally driven by hydraulic means. Details of this hydraulic drive system are not shown herein in detail because such hydraulic drive systems are commonly used on automatic tobacco harvesters and are commonly used to drive knife-type defoliator assemblies. Suffice to say that one approach to driving the defoliator unit 100 entails utilizing a hydraulic motor and a chain drive to drive both the upper rotors 102 of the defoliator unit 100. Also, it is common to synchronize the longitudinal speed component of the knives 108 and 109 with the ground speed. This, as suggested, is commonly accomplished today in commercially available automatic tobacco harvesters and those skilled in the art will appreciate such. For an understanding of such a hydraulic control system, one is referred to U.S. Pat. No. 3,999,359, the disclosure thereof being expressly incorporated herein by reference.

To assist the defoliating operation, the harvester 10 includes a fan assembly 120 that is mounted above the defoliator unit 100. Fan assembly 120 generates a system of air and directs the system of air downwardly onto the underpassing tobacco leaves and in the process blows the leaves downwardly and that assists in cutting the leaves from the stalk at a point near the stalk itself.

For conveying the defoliated leaves away from the defoliator unit 100 and transferring the leaves to a trailing trailer or receptacle (not shown), there is provided a conveyer assembly 122, disposed adjacent the defoliator unit 100, for receiving and conveying the leaves. The conveyor assembly 122 includes a right hand and left hand conveyor unit. The right hand conveyor unit is supported in part at least by the right side brace network 50 that projects forwardly from the mainframe 30. In addition, there is provided a pair of upright supports mounted to the upper cross-member 32 of the mainframe 30 for supporting a part of each conveyor unit directly over the mainframe. The left-hand conveyor unit on the other hand is supported by the intermediate brace network 52 (FIG. 1A) that is secured to the mainframe 30 and projects therefrom. Like the right hand conveyor unit, the left hand conveyor unit is also supported directly above the upper cross-member 32 of the mainframe 30 by a pair of vertical supports.

Briefly reviewing the conveyor assembly 122, it is seen that the respective conveyor units each includes a lower apron belt 124 and an elevator belt 126 that includes a series of spaced apart transverse slats. In addition to confine the tobacco leaves on the conveyor assembly, there is provided a lower side frame 128 that is secured to the outside of each conveyor unit and a series of upper side frames 130 that confine the tobacco leaves on the conveyor assembly as the tobacco leaves are moved upwardly toward an elevated discharge point.

As noted above, the harvester 10 includes a receptacle mounted behind the conveyor assembly 122 or is adapted to pull a trailer behind the conveyor assembly 122 in order that the harvested leaves may be discharged into the receptacle or the trailer. Either option would be suitable. However, it is contemplated that the harvester 10 would be designed to pull a trailer (not shown). To provide for such, a trailer hitch 42 is mounted on the lower cross member 34 of the mainframe 30 (FIG. 5).

Figure 1B:
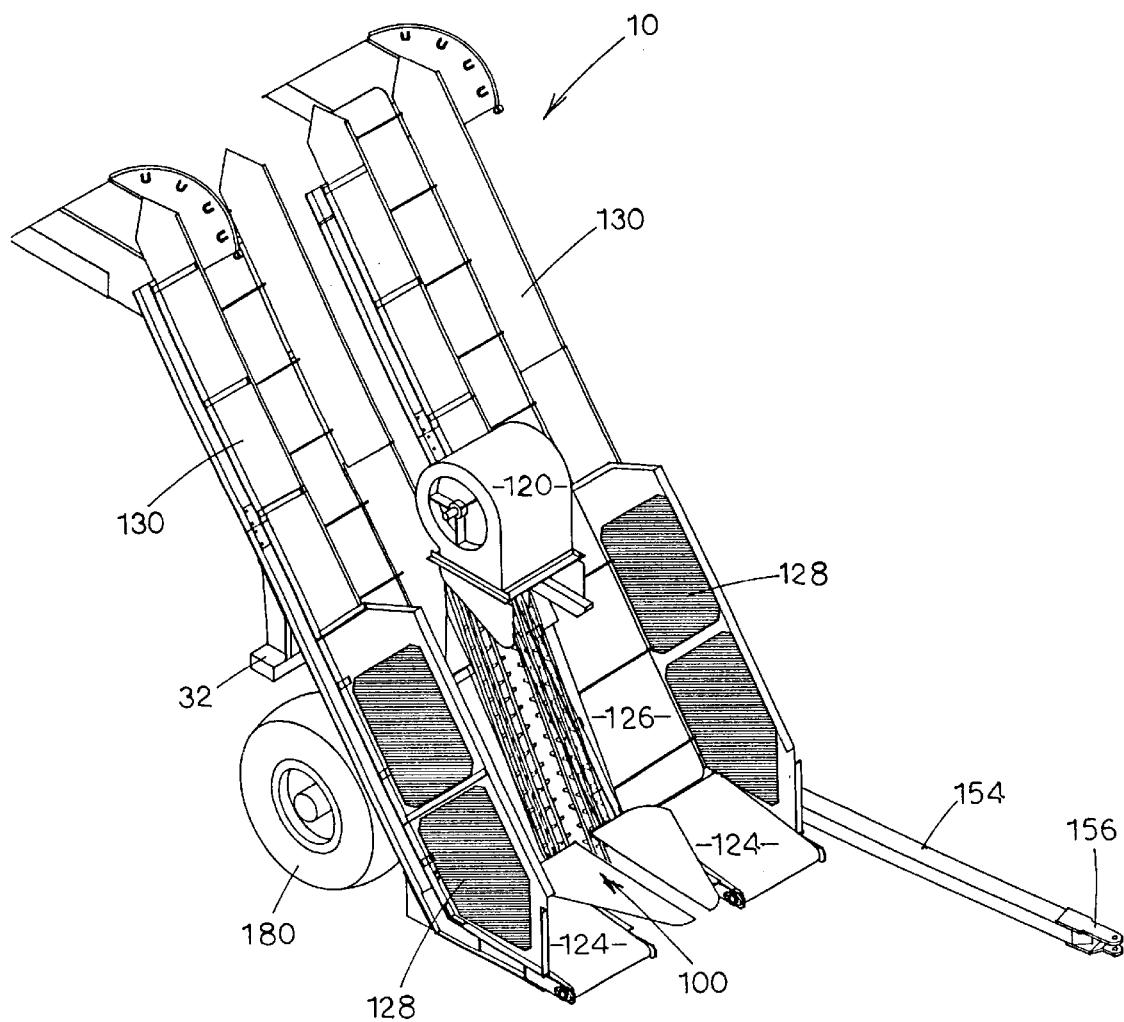
FIG. 1B is a perspective view of the pull-type tobacco harvester as viewed from the outboard side of the harvester.

As seen in FIGS. 1A and 1B, the pull-type tobacco harvester 10 is provided with a tongue assembly 150. Tongue assembly 150 is adjustably mounted on the inboard side of the mainframe to the lower cross-member 34. By being adjustably mounted, it is meant that the tongue assembly 150 can be shifted laterally back and forth on the lower cross-member 34 to arrive at a particular offset relationship between a selected tractor 12.

Viewing the tongue assembly 150 in more detail, it is seen that the same includes a base member 152 (FIG. 5) and a main tongue section 154 that extends from the base member. A clevis 156 is formed on the terminal end of the main tongue section 154. A diagonal brace 164 extends from the base member 152 and connects with the main tongue section 154.

Secured to the base member 152 and extending rearwardly therefrom is a pair of connecting tabs 158 that are adapted to be connected to a pair of plate brackets 160. The plate brackets 160 are in turn connected to the lower cross-member 34 of the mainframe via a series of U-bolts 162.

Figure 2:
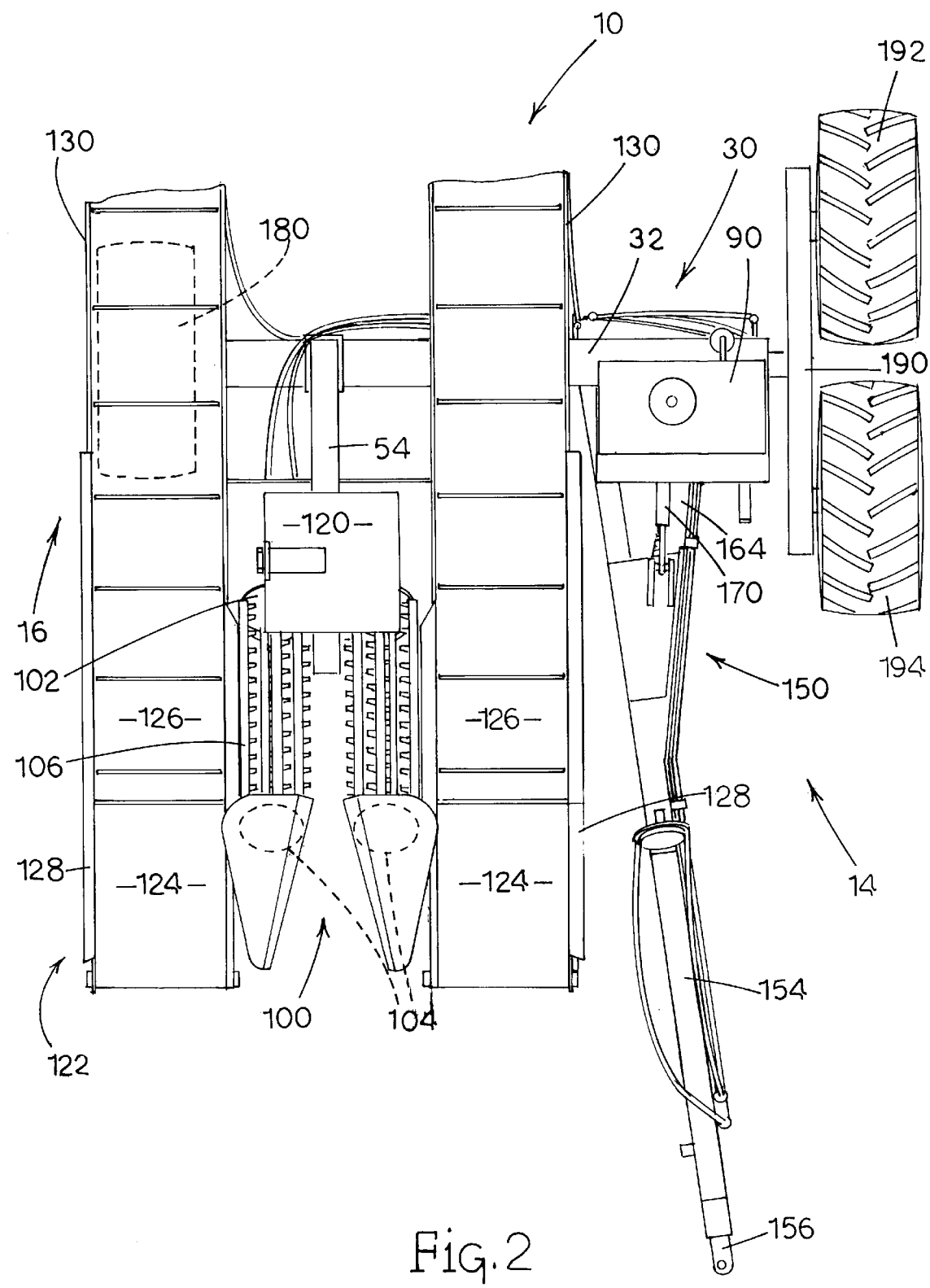
FIG. 2 is a top plan view of the tobacco harvester.
Figure 3:
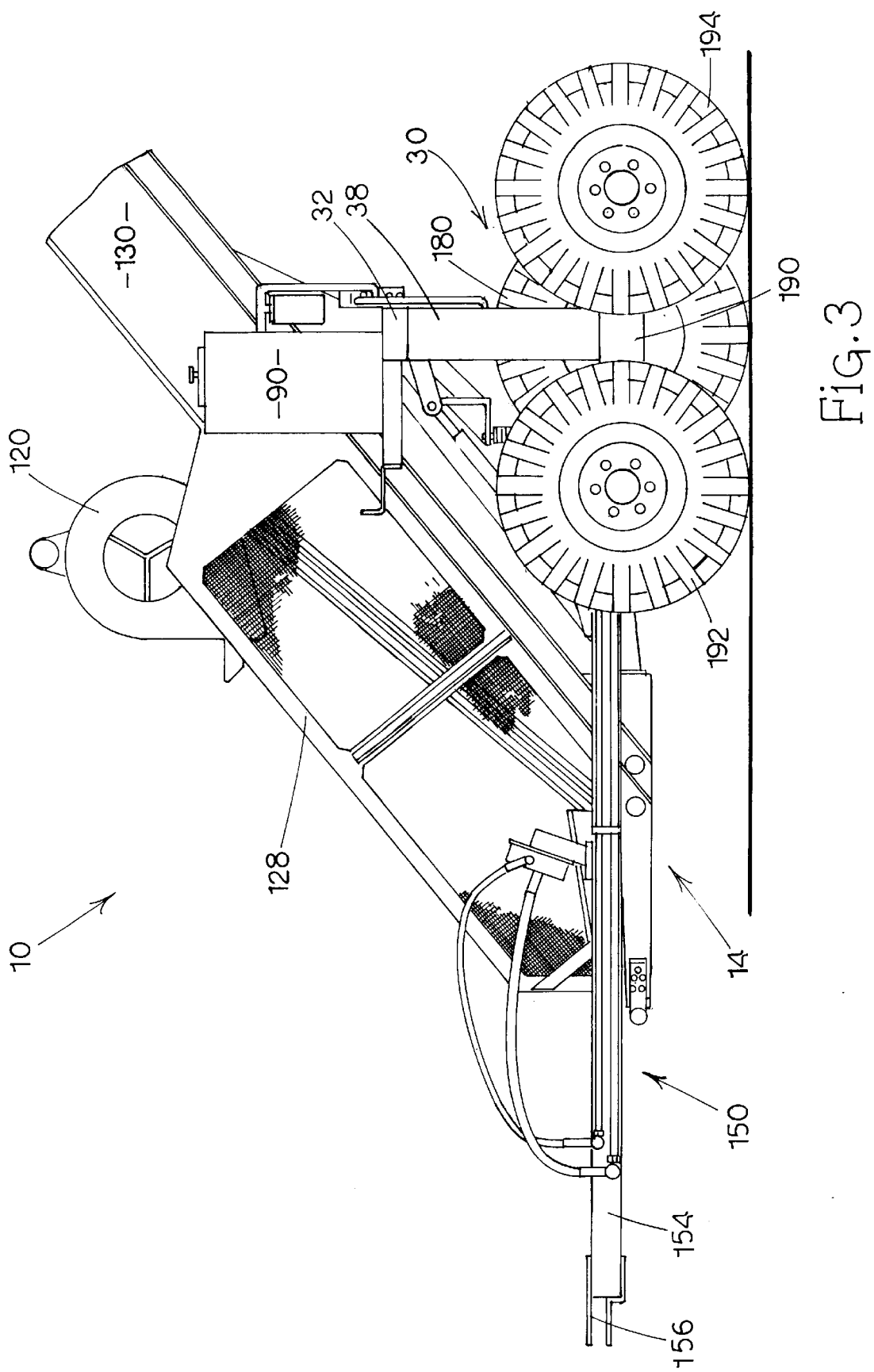
FIG. 3 is a side elevational view showing the inboard side of the harvester.

As seen in FIGS. 1 and 2, the tongue assembly 150 and particularly the main tongue section 154 extends generally forwardly but angles slightly outwardly towards the inboard side 14 of the harvester. This allows the tobacco harvester 10 to be pulled behind a tractor 12 in an offset relationship as schematically illustrated in FIG. 8.

Interconnecting the tongue assembly 150 and the mainframe 30 is an adjustable connecting link 170. By adjusting the length of the connecting link 170, the position of the mainframe 30 with respect to the tongue assembly 150 can be adjusted and in so doing, the attitude or height of the defoliator unit 100 can also be adjusted.

As seen in the drawings, particularly in FIG. 2, the tongue assembly 150 is shifted as far as practical towards the central area of the mainframe 30. Note that the central conveyor unit, as shown in FIG. 2, is generally aligned with the central point or area of the mainframe 30. The tongue assembly 150 is mounted to the lower cross-member 34 in close proximity to the side of the central conveyor unit facing the tandem wheels 192 and 194. It is appreciated that the closer the tongue assembly 150 can be aligned with the central area of the mainframe 30, the more accurately the harvester 10 will track. For practical reasons, the tongue assembly 150 cannot be connected directly to the central portion of the mainframe. But in the case of the present design, the tongue assembly is shifted inwardly from the inboard tandem wheels 192 and 194 to a position that is relatively close to the central area of the mainframe 30. In addition, note that the main tongue section 154 which is angled, still extends straight from its point of attachment adjacent the mainframe to the clevis 156. It is appreciated that the main tongue section 154 is connected to the mainframe 30 at a position that is just outwardly of the central area of the mainframe 30.

Now, turning to the wheel system of the present invention, it is seen that the mainframe 30 is supported by a single outboard wheel 180. Disposed on the opposite side or the inboard side, is a floating wheel arm 190. In particular, the wheel arm 190 is pivotally mounted to the mainframe 30 such that its opposite end portions can move up and down. Secured to opposite end portions of the wheel arm 190 is a pair of tandem wheels 192 and 194.

It is therefore appreciated that the tandem wheels 192 and 194 assume a position on the inboard side 14 of the harvester 10. As will be discussed subsequently herein, the tandem wheels 192 and 194 improve the tracking ability and the stability of the harvester 10.

Viewing FIG. 8, the tobacco harvester 10 is shown in a tobacco field and being pulled therethrough by a tractor 12. Note that the harvester 10 is designed to be pulled in an offset position with respect to the tractor 12. For purposes of this discussion, the tobacco row being harvested by the harvester 10 is referred to by the numeral 200. Disposed to the right of row 200 is a right hand middle 202 and disposed to the left is a left hand middle 204. Also disposed to the left of row 200 is a left hand row 206 that has been previously harvested and the stalks thereof have been cut, and disposed just to the left of the row 206 is a second left hand middle 208.

With the above in mind, note from FIG. 8 where the defoliator unit 100 is aligned with the row 200 being harvested. Note also that the outboard side wheel 180 assumes a tracking path within the right hand middle 202. Also, the mainframe 30 on the inboard side projects over the left middle 204 and even over the adjacent left hand row 206. The pair of tandem wheels 192 and 194 disposed on the inboard side 14 of the harvester assume a position in the second left hand middle 208. Thus, the tandem wheels 192 and 194 track behind the tractor 12 and more particularly track behind the left hand front and rear wheels of the tractor.

As seen in FIG. 8, the general instability and the tendency of the offset harvester 10 to inaccurately track is a result in part of the tendency of the harvester 10 to rotate counterclockwise, as viewed in FIG. 8, about the area occupied by the inboard wheel structure. This is because of the offset relationship of the tobacco harvester 10 with respect to the tractor and particularly because of the angled orientation of the tongue with respect to the harvester 10 and the tractor 12. However, with the dual tandem wheels 192 and 194, the tendency of the harvester 10 to rotate counterclockwise (FIG. 8) about the two wheels, as opposed to a single wheel, is reduced or minimized by providing the two tandem wheels and by providing some space between the two wheels.

In addition, it is postulated that because of the additional traction afforded by the pair of tandem wheels 192 and 194, especially compared to the traction of the single outward wheel 180, and the fact that the inboard tandem wheels 192 and 194 are aligned with the tractor 12, that the harvester will have a tendency to more accurately track especially in wet or hilly conditions. This, of course, is important because of the close tolerances that exists between the two side defoliator units and the requirement that the defoliator unit 100 as a whole should be squarely aligned with the oncoming row 200 being harvested.

Returning briefly to the defoliator unit 100, it is appreciated that the elongated bead 110 formed on the inner side 106a of each of the defoliator bars 106 assists in uprighting and urging and walking the blown over stalks of tobacco into a proper a upright harvesting position. This is because the beads 110 tends to prevent the stalks from moving directly into contact with the inner side 106a of the defoliator bars where the stalks would be more prone to be cut by the knives particularly the portion of the transverse blade or knives 108 that directly abut the inner side 106a.

From the foregoing specification and discussion, it is appreciated that the present application presents a pull-type automatic tobacco harvester that will more accurately track in the field even under wet and hilly conditions and which is more stable. Consequently, this translates into assisting the operator in maintaining a better alignment between the row 200 being harvested and the inlet or throat of the defoliator unit 100. In addition, the stalk guide or spacer formed on the defoliator bars assist the tobacco harvester in harvesting blown over or tilted stalks without unduly cutting and damaging the stalks and the crop in the process.

The present invention may, of course, be carried out in other specific ways than those herein set forth without parting from the spirit and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A pull-type tobacco harvester having inboard and outboard sides and comprising: a mainframe having inboard and outboard side portions; a leaf defoliating unit mounted on the tobacco harvester for defoliating leaves from the tobacco stalks as the pull-type tobacco harvester is pulled through a tobacco field; at least one wheel mounted to the outboard side portion of the mainframe; at least two tandem wheels mounted to the inboard side portion of the mainframe and wherein the number of wheels on the inboard side exceeds the number of wheels on the outboard side; and an angled tongue secured to the mainframe adjacent the inboard side portion of the mainframe and wherein the tongue is angled relative to the mainframe such that the tongue projects forwardly from the mainframe and towards the path of the tandem wheels and the inboard side of the harvester.

2. The pull-type tobacco harvester of claim 1 wherein the at least two tandem wheels are spaced relative to the at least one wheel such that the axis of rotation of all the wheels is misaligned.

3. The pull-type tobacco harvester of claim 2 wherein the at least two tandem wheels includes a front wheel and a rear wheels and wherein the front wheel is disposed forwardly of the at least one wheel mounted on the outboard side while the rear wheel is disposed rearwardly of the at least one wheel.

4. The pull-type tobacco harvester of claim 1 wherein the tongue establishes a tractor position that is generally offset with respect to the tobacco harvester, and wherein the at least two tandem wheels are spaced relative to the tobacco harvester such that they track behind the tractor position when the harvester is being pulled by a tractor in a generally straight line.

5. The pull-type tobacco harvester of claim 4 wherein the defoliating unit is adapted to be aligned with a tobacco row having a middle disposed on each side thereof, and wherein the side of the mainframe having the at least two tandem wheels thereon project over an adjacent middle and over an outer adjacent row such that the at least two tandem wheels track in a second middle spaced from the row being harvested.

6. The pull-type tobacco harvester of claim 1 including a floating wheel arm pivotally connected to the inboard side portion of the mainframe and wherein the wheel arm includes opposite end portions and wherein the at least two tandem wheels are mounted on opposite end portions of the wheel arm.

7. A pull-type tobacco harvester adapted to be pulled through a tobacco field from an offset position behind a tractor and wherein the harvester includes inboard and outboard sides, the pull-type tobacco harvester comprising:

a) a mainframe having inboard and outboard sides;

b) a defoliator unit mounted on the mainframe for harvesting a row of tobacco;

c) a pair of conveyor assemblies mounted on the mainframe with each conveyor assembly being disposed on one side of the defoliator unit for conveying harvested tobacco leaves upwardly and rearwardly on the tobacco harvester;

d) a tongue projecting forwardly from the mainframe and adapted to be connected to a tractor, the tongue being angled towards the inboard side of the tobacco harvester such that when the harvester is pulled through a tobacco field the harvester assumes an offset position with respect to the pulling tractor; and e) an improved tracking system for the pull-type tobacco harvester that improves the stability and tracking ability of the pull-type tobacco harvester, the improved tracking system including at least two spaced apart tandem wheels mounted to the mainframe on the inboard side of the tobacco harvester and at least one wheel mounted on the outboard side of the harvester, the at least two tandem wheels being spaced with respect to the mainframe such that they track behind the tractor pulling the pull-type tobacco harvester during a normal harvesting operation and wherein the number of wheels on the inboard side exceeds the number of wheels on the outboard side.

8. The pull-type automatic tobacco harvester of claim 7 wherein the at least two tandem wheels are movably mounted such that each of the tandem wheels may float and move up and down with respect to the mainframe and the harvester as the harvester is pulled through the field.

9. The pull-type automatic tobacco harvester of claim 8 including a wheel arm pivotally mounted to the inboard side of the mainframe and wherein the wheel arm includes opposite end portions and wherein the at least two tandem wheels mounted to the inboard side of the pull-type tobacco harvester are mounted on opposite end portions of the wheel arm.

10. The pull-type automatic tobacco harvester of claim 9 including the at least one wheel on the outboard side of the harvester and the at least two wheels disposed on the inboard side of the harvester with each wheel including an axis of rotation, and wherein the axis of rotation of the at least one wheel on the outboard side assumes a position generally intermediately between the axis of rotation of the at least two wheels on the inboard side of the harvester.

11. The pull-type automatic tobacco harvester of claim 10 wherein the mainframe is short in length relative to its transverse width, and wherein the mainframe comprises a generally vertical upright frame structure including a series of transverse cross-members and at least two vertical members, and wherein the axis of rotation of the at least one wheel disposed on the outboard side of the tobacco harvester is generally aligned with the vertical mainframe while the axes of rotation of the tandem wheels are disposed forwardly and rearwardly of the vertical mainframe.

12. The pull-type automatic tobacco harvester of claim 9 wherein the tongue is secured to the mainframe adjacent the pair of tandem wheels such that the tongue projects forwardly from a position adjacent the tandem wheels and is angled outwardly towards the inboard side of the harvester.

13. The pull-type automatic tobacco harvester of claim 12 wherein the tongue includes an elongated main tongue section and a reinforcing diagonal tongue member that joins the main tongue section intermediately thereon and wherein the diagonal reinforcing tongue member extends rearwardly from the main tongue section so as to form an angle between the main tongue section and the diagonal reinforcing tongue member.

14. A pull-type tobacco harvester comprising inboard and outboard sides, a mainframe, a defoliator unit mounted on the mainframe for harvesting a row of tobacco; a conveyor assembly mounted on the tobacco harvester adjacent the defoliator unit for conveying harvested tobacco leaves to a discharge area; a tongue mounted to the mainframe adjacent the inboard side of the harvester; and projecting forwardly therefrom; one wheel mounted on the outboard side of the harvester a floating wheel arm pivotally mounted to the mainframe on the inboard side of the harvester; a pair of spaced apart tandem wheels mounted on the wheel arm and wherein the pair of tandem wheels assume a position along the inboard side of the harvester where the tandem wheels tend to stabilize the harvester and improve its tracking ability.

15. The pull-type automatic tobacco harvester of claim 14 wherein the floating wheel arm includes opposite end portions and is pivotally attached to the mainframe such that the opposite end portions may move up and down with respect to the mainframe as the harvester traverses a tobacco field.

16. The tobacco harvester of claim 16 wherein the mainframe comprises an upright vertical frame structure having upper and lower cross-members that are generally vertically aligned and wherein the tandem wheels mounted on the inboard side of the harvester are spaced such that one of the tandem wheels is disposed forwardly with respect to the cross-members while the other tandem wheel is disposed rearwardly relative to the cross-members; and wherein the wheel that is mounted to the outboard side of the harvester in general alignment with the upper and lower cross-members.

17. The tobacco harvester of claim 16 wherein the axis of rotation of the wheel mounted to the outboard side of the harvester extends intermediately between the axes of rotation of the two tandem wheels disposed on the inboard side of the harvester.

18. The tobacco harvester of claim 14 wherein the mainframe comprises an upright vertical frame structure including upper and lower cross-members, and wherein the tongue is mounted to the lower cross-member adjacent the floating wheel arm.

19. The tobacco harvester of claim 18 wherein the tongue is adjustable laterally back and forth on the lower cross-member of the mainframe of the harvester.

* * * * *